United States Patent [19]
Dibrino et al.

[11] Patent Number: 6,061,707
[45] Date of Patent: May 9, 2000

[54] METHOD AND APPARATUS FOR GENERATING AN END-AROUND CARRY IN A FLOATING-POINT PIPELINE WITHIN A COMPUTER SYSTEM

[75] Inventors: Michael Thomas Dibrino, Austin; Faraydon Osman Karim, Round Rock, both of Tex.

[73] Assignee: International Business Machines Corporation, Armonk, N.Y.

[21] Appl. No.: 09/008,462

[22] Filed: Jan. 16, 1998

[51] Int. Cl.[7] .................................................... G06F 7/38
[52] U.S. Cl. .......................................... 708/505; 708/501
[58] Field of Search ..................................... 708/523, 550, 708/551, 495, 496, 497, 498, 499, 501, 505, 603

[56] References Cited

U.S. PATENT DOCUMENTS

| | | |
|---|---|---|
| 4,969,118 | 11/1990 | Montoye et al. ........................ 708/501 |
| 5,040,138 | 8/1991 | Maher, III ................................ 708/497 |
| 5,241,493 | 8/1993 | Chu et al. ................................ 708/501 |
| 5,790,445 | 8/1998 | Eisen et al. ............................. 708/505 |
| 5,880,983 | 3/1999 | Elliott et al. ............................ 708/501 |

*Primary Examiner*—Chuong Dinh Ngo
*Attorney, Agent, or Firm*—Casimer K. Salys; Antony P. Ng; Andrew J. Dillon

[57] ABSTRACT

An apparatus for generating an end-around carry to an end-around carry adder in a floating-point pipeline within a computer system is disclosed. The apparatus for generating an end-around carry includes a shift-comparison logic circuit, a sign-comparison circuit, and a logic gate. The shift-comparison logic circuit produces a shift-count signal and the sign-comparison logic circuit produces an effective operation signal. Coupled to the shift-comparison logic circuit and the sign-comparison logic circuit, the logic gate combines the shift-count signal and the effective operation signal with a carry-out signal generated by an end-around carry adder to provide an end-around carry signal for the end-around carry adder.

16 Claims, 5 Drawing Sheets

METHOD AND APPARATUS FOR GENERATING AN END-AROUND CARRY IN A FLOATING-POINT PIPELINE WITHIN A COMPUTER SYSTEM

BACKGROUND OF THE INVENTION

1. Technical Field

The present invention relates to a method and apparatus for data processing in general, and in particular to a method and apparatus for floating-point processing within a computer system. Still more particularly, the present invention relates to a method and apparatus for generating an end-around carry for an end-around carry adder in a floating-point pipeline within a computer system.

2. Description of the Prior Art

Within a computer system, a floating-point pipeline typically operates in a sign-magnitude format; that is, the sign and magnitude of an operand within the floating-point pipeline are represented by separate bits as specified in the IEEE-754 floating-point standard. According to the IEEE-754 floating-point standard, a floating-point number w, for example, is represented by three components, namely, a sign, an exponent, and a mantissa. The most significant bit of the floating-point number w is the sign bit. The next eight bits are the exponent. The exponent is represented in an "excess −127" format in which a "bias" of 127 is added to the actual exponent to yield the 8-bit exponent. The mantissa is represented by a 23-bit fraction preceded by an implied "1" for a normalized number or without the implied "1" for an un-normalized number.

Typically, addition and subtraction of two floating-point operands are performed by a sign-magnitude adder embedded within one of the stages of the floating-point pipeline. In order to perform a subtraction (or more appropriately, an addition of a negative operand), one of the two operands must be inverted internally within the sign-magnitude adder. According to the one's complement representation, an end-around carry is required to complete such an inversion. Generally speaking, methods for end-around carry generation are well-known; however, the processing speed of these prior art methods are satisfactory at best. The delays in cycle time within the floating-point pipeline attributed to the prior art methods for end-around carry generation are significantly worse when wider adders, such as those utilized to perform double-precision arithmetic, are utilized. Consequently, it would be desirable to provide an improved method for generating an end-around carry in a floating-point pipeline within a computer system.

SUMMARY OF THE INVENTION

In view of the foregoing, it is therefore an object of the present invention to provide an improved method and apparatus for data processing.

It is another object of the present invention to provide an improved method and apparatus for floating-point processing within a computer system.

It is yet another object of the present invention to provide an improved method and apparatus for generating an end-around carry for an end-around carry adder in a floating-point pipeline within a computer system.

In accordance with a preferred embodiment of the present invention, an apparatus for generating an end-around carry includes a shift-comparison logic circuit, a sign-comparison circuit, and a logic gate. The shift-comparison logic circuit produces a shift-count signal, and the sign-comparison logic circuit produces an effective operation signal. Coupled to the shift-comparison logic circuit and the sign-comparison logic circuit, the logic gate combines the shift-count signal and the effective operation signal with a carry-out signal generated by an end-around carry adder to provide an end-around carry signal for the end-around carry adder.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be applicable to a variety of floating-point pipeline designs in different computer systems. Although a single-precision floating-point pipeline is utilized to illustrate an exemplary embodiment of the invention, it is understood by those skilled in the art that the concepts described herein may be applied to a floating-point pipeline of any size or precision.

Figure 1:
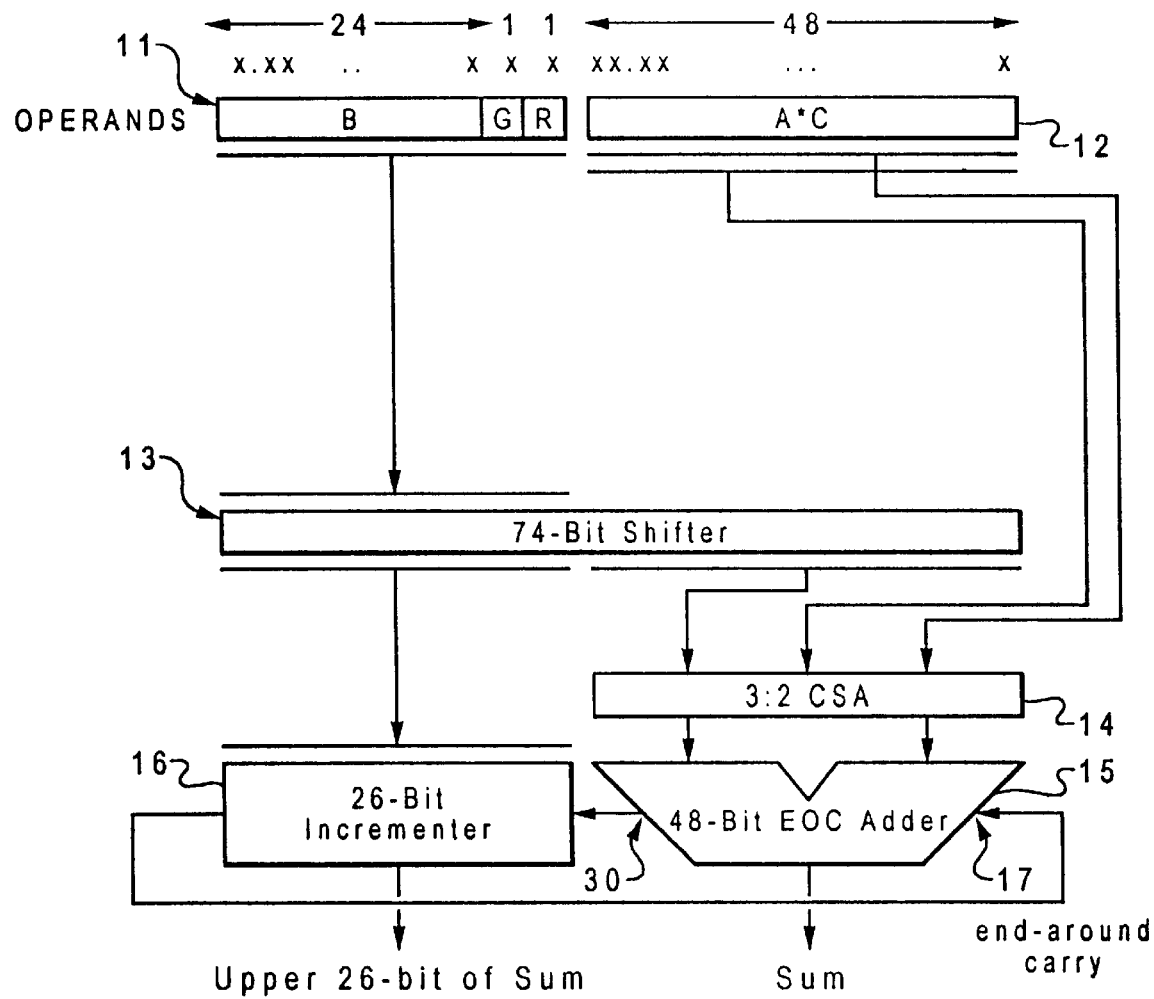
FIG. 1 is a block diagram of a single-precision floating-point pipeline according to the prior art.

Referring now to the drawings and in particular to FIG. 1, there is depicted a block diagram of a single-precision floating-point pipeline according to the prior art. As shown, a B-operand 11 is aligned to the left of A*C-operand (product of A and C) 12 such that only a right shift is required to align B-operand 11 with A*C-operand 12 for performing an addition or substraction. For simplicity and clarity, only the mantissa (fractional) portion of operands 11 and 12 are shown because conventionally only the mantissas participate in addition or subtraction operations.

For an addition operation, twenty-six bits of B-operand 11 (twenty-three fraction bits with an implied leading bit to denote a normalized operand, one guard bit, and one round bit) are first fed into a 74-bit shifter 13. Within 74-bit shifter 13, each of the twenty-six bits, now representing B-operand 11, will be shifted anywhere from 0 to 74 bit positions such that B-operand 11 will be aligned with A*C-operand 12. The amount of shifting is completely influenced by the difference between the B-exponent and the A*C-exponent. The implied decimal point for A*C-operand 12 typically lies between bits 27 and 28 within 74-bit shifter 13. Bits 26 and 27 represent the integer portion of A*C-operand 12. If the exponents of B-operand 11 and A*C-operand 12 were equal, then the amount of shifting for B-operand 11 would be exactly 27. However, most likely the exponents of B-operand 11 and A*C-operand 12 are different; in that case, the shift magnitude is determined by the formula:

(A-exponent+C-exponent)−(B-exponent−27), while ignoring any operand "bias" in the exponent representation. When the exponents are represented by the "excess −127" format, however, the following formula:

(A-exponent+C-exponent)−(B-exponent−29)

is utilized to determined the shift magnitude.

The least significant 48 bits of the aligned B-operand and the A*C-operand (i.e., A*C sum and A*C carry) are then combined in a 3:2 carry-save adder (CSA) 14. The sum and carry from CSA 14 are subsequently sent to a 48-bit end-around carry (EOC) adder 15 to generate a final SUM.

Notice that in this implementation, which is typical of most high-performance pipelined processors, the upper 26 bits of the final SUM are formed by a 26-bit incrementer 16 instead of EOC adder 15. It is possible to utilize an incrementer in this implementation because the A*C product does not contribute any digits to the most significant 26 bits of the final SUM. In other words, the upper 26 bits of the final SUM are entirely composed of the B-operand (integer portion, mantissa, plus guard and round bits) along with any carry-out bit generated by EOC adder 15. Furthermore, an incrementer is more preferable because an incrementer typically requires less silicon area than an EOC adder and also processes faster than an EOC adder.

As shown in FIG. 1, a carry-out bit generated by EOC adder 15 at a carry-out 30 must propagate through incrementer 16 to be fed back into a carry-in 17 of EOC adder 15 as an end-around carry for generating the final SUM. This path represents a critical path that causes long delays in this prior art floating-point pipeline architecture. Although FIG. 1 shows a total of 74 bits (48 bits from EOC adder 15 plus 26 bits from incrementer 16) for single-precision floating-point operands, this critical path can easily grow to at least 160 bits (106 bits from an EOC adder plus 54 bits from an incrementer) for double-precision floating-point operands.

Figure 2:
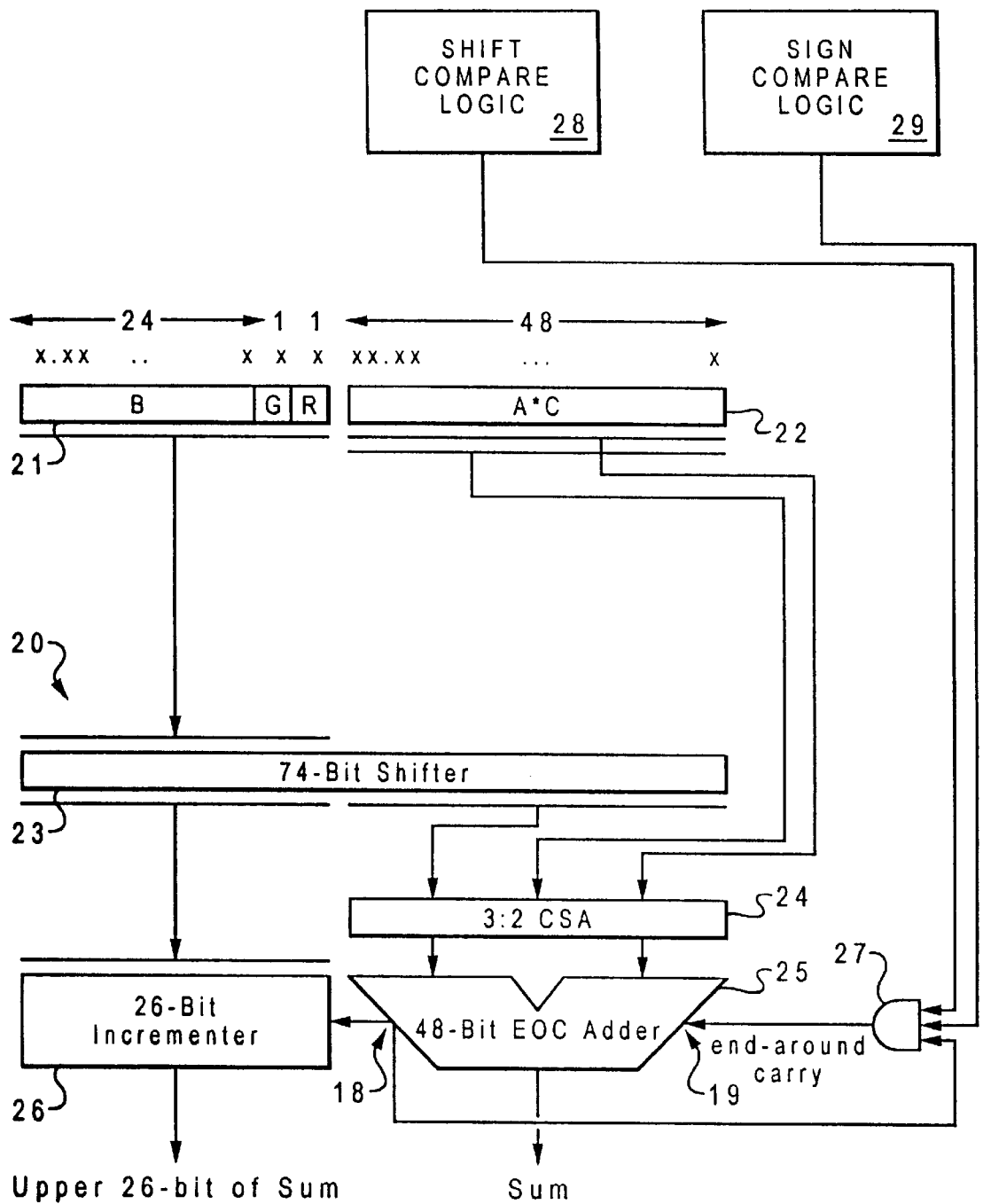
FIG. 2 is a block diagram of a single-precision floating-point pipeline in accordance with a preferred embodiment of the present invention.

With reference now to FIG. 2, there is depicted a block diagram of a single-precision floating-point pipeline in accordance with a preferred embodiment of the present invention. Similar to FIG. 1, single-precision floating-point pipeline 20 includes a 74-bit shifter 23, a 3:2 CSA 24, a 48-bit EOC adder 25, and a 26-bit incrementer 26.

During operation, a B-operand 21 is initially fed into 74-bit shifter 23 which shifts B-operand 21 relative to an A*C-operand 22. The least significant 48 bits of the aligned B-operand and the A*C operand (i.e., A*C sum and A*C carry) are then combined in a 3:2 CSA 24. The sum and carry from CSA 24 are subsequently sent to a 48-bit EOC adder 25 to generate a final SUM. Similar to the prior art implementation, a 26-bit incrementer 26 is utilized to generate the upper 26 bits of the final SUM. But unlike the prior art, the critical path for generating a end-around carry is reduced.

According to a preferred embodiment of the present invention, a carry-out 18 from EOC adder 25 is routed directly back to a carry-in 19 of EOC adder 25 via a three-input AND gate 27. Three-input AND gate 27 combines a carry-out signal from carry-out 18 of EOC adder 25 with a shift-count signal from a shift-comparison logic 28 and an effective operation signal from a sign-comparison logic 29 to form an end-around carry signal. This end-around carry signal is fed back to carry-in 19 of EOC adder 25. Three-input AND gate 27 performs the following logic function: a carry-out bit generated by EOC adder 25 is fed back to carry-in 19 of EOC adder 25 only if shift-comparison logic 28 indicates that a shift-count is greater than or equal to 26 and sign-comparison logic 29 indicates that an effective operation of EOC adder 25 is a subtraction. Or simply put, a logical "1" will occur at carry-in 19 if and only if the carry-out bit of EOC adder 25 is also a logical "1," according to the one's complement representation. For all other conditions, a logical "0" will appear at carry-in 19 of EOC adder 25.

Figure 3:
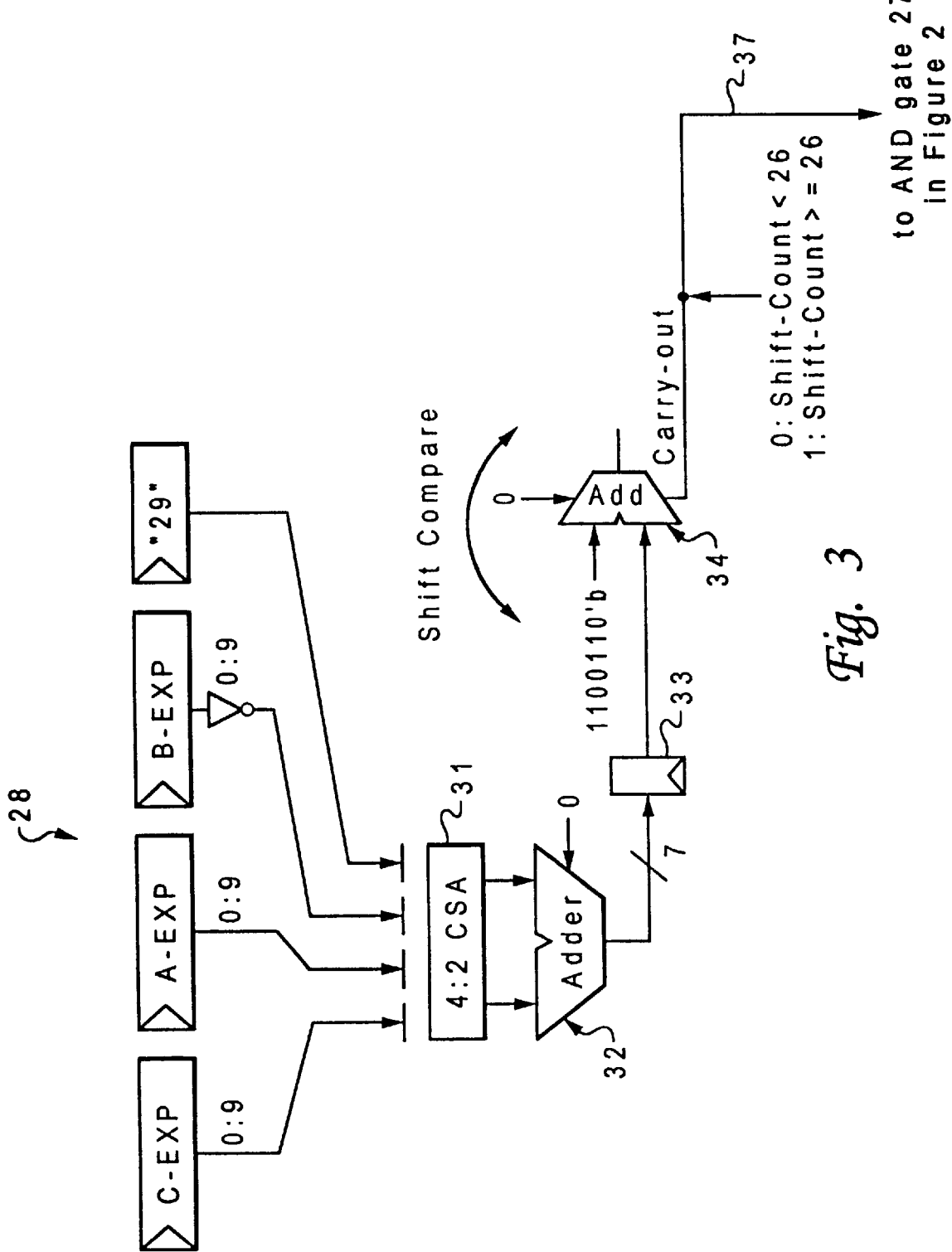
FIG. 3 is a block diagram of shift-comparison logic in accordance with a preferred embodiment of the present invention.

Referring now to FIG. 3, there is illustrated a block diagram of shift-comparison logic 28 from FIG. 2, in accordance with a preferred embodiment of the present invention. Shift-comparison logic 28 includes a 4:2 CSA 31, an adder 32, a latch 33, and a 7-bit adder 34. A 10-bit C-EXP (exponent bits of C-operand, a 10-bit A-EXP (exponent bits of A-operand), a 10-bit B-EXP (exponent bits of B-operand), and a number 29 (a numerical constant) are added together by CSA 31 to provide a 10-bit sum and a 10-bit carry. The 10-bit sum and the 10-bit carry are then input to adder 32 with no carry-in to provide a 7-bit shift-count. Subsequently, adder 34 performs a shift-comparison by adding $1100110_2$ (or $-26_{10}$) to the 7-bit shift-count. This shift-comparison determines whether B-operand 21 from FIG. 2 lies entirely "underneath" A*C-operand 22 from FIG. 2. Finally, shift-comparison logic 28 provides a shift-count signal at output 37-the carry-out of adder 34. A carry-out bit of "0" from adder 34 indicates the shift-count is less than 26, and a carry-out bit of "1" from adder 34 indicates the shift-count is greater than or equal to 26.

Notice that latch 33 separates the shift-comparison stage from a previous stage, which exists in the same stage as EOC adder 25 from FIG. 2. The position of latch 33 may vary, depending upon timing constraints. Furthermore, a comparator may be utilized instead of adder 34 for the purpose of shift-comparison.

TABLE I

| Sign of AC (0-Positive, 1-Negative) | Sign of B (0-Positive, 1-Negative) | Operation bit (0-Add, 1-Subtract) | Function Performed by Overall Logic | Function Performed by CSA Adder |
| --- | --- | --- | --- | --- |
| 0 | 0 | 0 | AC + B | AC + B |
| 0 | 1 | 0 | AC − B | AC − B |
| 1 | 0 | 0 | −(AC − B) | AC − B |
| 1 | 1 | 0 | −(AC + B) | AC + B |
| 0 | 0 | 1 | AC − B | AC − B |
| 0 | 1 | 1 | AC + B | AC + B |
| 1 | 0 | 1 | −(AC + B) | AC + B |
| 1 | 1 | 1 | −(AC − B) | AC − B |

Figure 4:
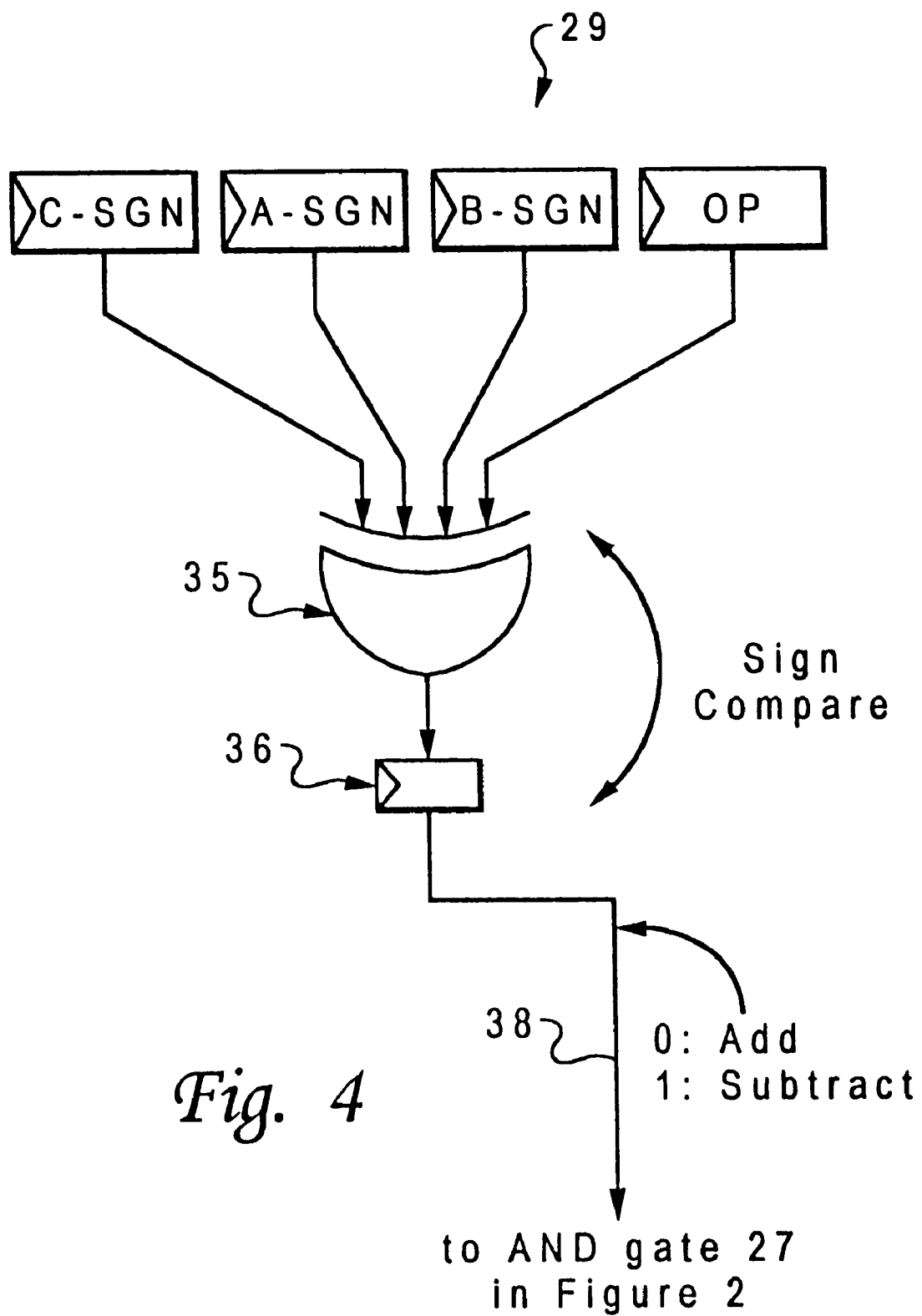
FIG. 4 is a block diagram of sign-comparison logic in accordance with a preferred embodiment of the present invention.

With reference now to FIG. 4, there is illustrated a block diagram of sign-comparison logic 29 from FIG. 2, in accordance with a preferred embodiment of the present invention. Sign-comparison logic 29 includes a four-input XOR gate 35 and a latch 36. A C-SGN (sign bit of C-operand), an A-SGN (sign bit of A-operand), a B-SGN (sign bit of B-operand), and an OP (operation bit) are input to four-input XOR gate 35. Preferably, the operation bit OP indicates an addition operation as a logical "0" and a subtraction operation as a logical "1." Based on the four inputs to four input XOR gate 35, sign-comparison logic 29 provides an effective operation signal at an output 38, indicating an effective operation for CSA adder 24 from FIG. 2. Preferably, a logical "0" at output 38 indicates the effective operation for CSA adder 24 is an addition, and a logical "1" at output 38 indicates the effective operation for CSA adder 24 is a subtraction. The overall operation performed by sign-comparison logic 29 is summarized in Table I.

As shown, the present invention utilizes the exponents of B-operand 21 and A*C-operand 22 to determine the end-around carry bit for EOC adder 25. This is different from the prior art which relies on the propagation of a carry-out bit through either a 26-bit incrementer (for single-precision) or a 55-bit incrementer (for double-precision). With the present invention, there are basically three different cases to consider:

Case I: Addition operation (position of B-operand within the EOC adder and the incrementer is irrelevant);

Case II: Subtraction operation and B-operand does not overlap incrementer (B-operand fits entirely within the EOC adder); and Case III: Subtraction operation and B-operand overlaps the EOC adder and the incrementer.

There are three alignment conditions to consider in case I. The first alignment condition occurs when the B-operand lies entirely "underneath" the A*C-operand within the EOC adder. In this case, there may be a carry-out from the EOC adder, but because all the operands are positive, each operand input to the incrementer will be "0" and thus the carry-out from the EOC adder will not be propagated through the incrementer. The second alignment condition occurs when the B-operand lies partially underneath the incrementer and partially underneath the EOC adder. In this case, there is guaranteed to be at least one leading zero to the left of the B-operand which will stop the carry-out from propagating through the incrementer for the same reason as above. Finally, the third alignment condition occurs when the B-operand is left-aligned with the left-edge of the incrementer. In this case, because the guard bit and the round bit (the rightmost two bits of the 26-bit B-operand) are all "0"s, then any carry-out from the EOC adder to the incrementer is again prevented from propagating through the incrementer.

Thus, for case I, there may be a carry-out from the EOC adder with two positive operands, but this carry-out is guaranteed not to propagate through the incrementer. Therefore, the end-around carry for the EOC adder may be set to a logical "0."

For case II in which a subtraction operation is being performed and the B-operand fits entirely within the EOC adder, the carry-out from the EOC adder will be sufficient to feed the end-around carry to the EOC adder. This is selected through comparison of the shift-count for the B-operand with $26_{10}$. Without allowing for any "bias," the B-shift exponent compare logic calculates the shift magnitude by the formula: (A-exponent+C-exponent)−(B-exponent −27). The lower seven bits of this (latched) shift-counter is utilized as an input to a compare block, which compares this value against $26_{10}$. When the shift counter is greater than or equal to $26_{10}$, the carry-out from the compare block is a logical "1." This enables a feedback path to be added directly from the carry-out of the EOC adder to the carry-in of the EOC adder as the end-around carry.

In case II, the condition of whether a B-operand or the A*C-operand is larger cannot be determined until a subtraction is performed. However, it is known that since the inputs to the incrementer will be zero (because the B-operand lies entirely to the "right" of the incrementer), the carry-in to the incrementer, if any, will simply be propagated to the carry-out of the incrementer (because all leading "0"s of the B-operand are inverted to leading "1"s when the B-operand is inverted for the subtraction). Therefore, in this case when the shift-count is greater than or equal to 26, the carry-out from the EOC adder instead of the carry-out from the incrementer, may be utilized as the end-around carry, because they are logically the same.

In case III, when a subtraction operation is being performed and the B-operand overlaps both the incrementer and the EOC adder, the carry-out from the shift-compare block will be a logical "0." Therefore, the carry-in of the EOC adder may also be set to a logical "0." In this case, the shift-count is less than 26 because the B-operand overlaps both the incrementer and the EOC adder. Thus, the magnitude of the B-operand is always larger than the magnitude of the A*C operand. The product of the mantissa A*C from the multiplier is always considered to be positive, regardless of the actual sign bits in both A-operand and C-operand. The sign-magnitude adder will always perform the operation (AC+B) or (AC−B) according to Table I. In general, to compute B−AC is equivalent to performing the function, AC−B, then add the end-around carry (if any) and taking the one's complement of the result. However, since the magnitude of the B-operand is greater than that of the A*C operand, the final SUM will always be negative and the carry-out from the incrementer is guaranteed to be a "0." Thus, for any row in Table I in which the operation performed is AC−B, the end-around carry is a "0" and may be hardwired as such, regardless of the actual carry-out propagation through the incrementer.

TABLE II

| Operation (0-Addition, 1-Subtraction) | Shift-Count>=26? (0-No, 1-Yes) | Carry-out of EOC Adder | End-around carry for EOC Adder |
|---|---|---|---|
| 0 | 0 | 0 | 0 |
| 0 | 0 | 1 | 0 |
| 0 | 1 | 0 | 0 |
| 0 | 1 | 1 | 0 |
| 1 | 0 | 0 | 0 |
| 1 | 0 | 1 | 0 |
| 1 | 1 | 0 | 0 |
| 1 | 1 | 1 | 1 |

Therefore, for an effective subtract operation, the end-around carry should be set to a logical "1" only if the shift-count is greater than or equal to 26, indicating that the B-operand lies entirely "beneath" the EOC adder and a carry-out of the EOC adder occurs. As summarized in Table II, the last two rows indicates the conditions in which the end-around carry for the EOC adder "follows" the carry-out of the EOC adder.

Figure 5:
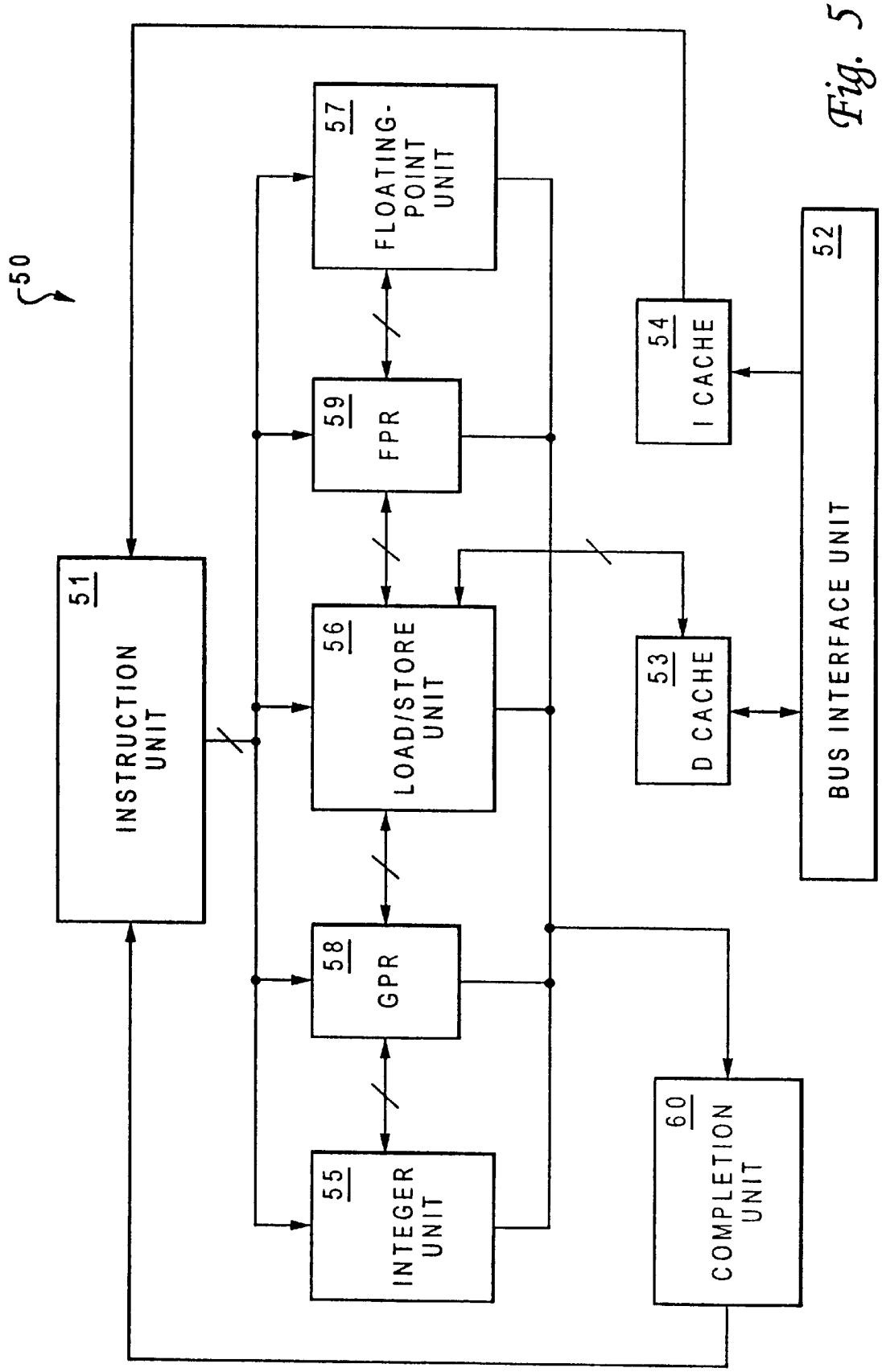
FIG. 5 is a block diagram of a floating-point processor in which a preferred embodiment of the present invention may be incorporated.

Referring now to FIG. 5, there is depicted a block diagram of a floating-point processor in which a preferred embodiment of the present invention may be incorporated. Within processor 50, a bus interface unit 52 is coupled to a data cache 53 and an instruction cache 54. Both data cache 53 and instruction cache 54 are high speed caches which enable processor 50 to achieve a relatively fast access time to a subset of data or instructions previously transferred from a main memory (not shown). Instruction cache 54 is further coupled to an instruction unit 51 which fetches instructions from instruction cache 54 during each execution cycle.

Processor 50 includes three execution units, namely, an integer unit 55, a load/store unit 56, and a floating-point unit 57. It is well-known to those skilled in the computer arts that each of the three execution units can execute one or more classes of instructions, and all execution units operate concurrently during each processor cycle. After execution has terminated, execution units 55, 56, and 57 store data results to a respective rename buffer, depending upon the instruction type. Then, execution units 55, 56, and 57 signal completion unit 60 that the execution unit has finished an instruction. Finally, instructions are completed in program order by transferring result data from the respective rename buffer to a general purpose register 58 or a floating-point register 59, accordingly.

As has been described, the present invention provides an improved method and apparatus for generating an end-around carry to an EOC adder in a floating-point pipeline within a computer system. In the present invention, a seven-bit (for single precision) or an eight-bit (for double-precision) 4:2 CSA adder and a seven- or eight-bit shift-compare is utilized for shift comparison, plus a 4-input XOR gate is utilized for sign comparison. The present invention improves the critical path in the prior art floating-point pipeline. It is estimated that the present invention could reduce the delay in the critical path by at least 30% to 40%.

While the invention has been particularly shown and described with reference to a preferred embodiment, it will be understood by those skilled in the art that various changes in form and detail may be made therein without departing from the spirit and scope of the invention.

What is claimed is:

1. An apparatus for generating an end-around carry for an end-around carry adder in a floating-point pipeline within a computer system, wherein said floating-point pipeline includes a first operand, a second operand, and a third operand, said apparatus comprising:

shift-comparison logic for providing a shift-count signal in response to exponent bits of each of said first, second, and third operands;

sign-comparison logic for providing an effective operation signal in response to a sign bit of each of said first, second, and third operands; and a logic gate, coupled to said shift-comparison logic and said sign-comparison logic, for combining said shift-count signal and said effective operation signal with a carry-out signal generated by said end-around carry adder to provide an end-around carry signal for said end-around carry adder.

2. The apparatus according to claim 1, wherein said shift-comparison logic includes a first adder, a second adder, and a comparator, wherein said first adder receives said exponent bits from said first, second, and third operands and a numerical constant.

3. The apparatus according to claim 2, wherein said numerical constant is 29.

4. The apparatus according to claim 2, wherein said shift-count signal is a logical "0" when a shift-count from said comparator is less than 26 and said shift-count signal is a logical "1" when a shift-count from said comparator is greater than or equal to 26.

5. The apparatus according to claim 1, wherein said sign-comparison logic includes an XOR gate for receiving said sign bits from said first, second, and third operands and an operation bit that indicate whether an operation is an addition or subtraction.

6. The apparatus according to claim 5, wherein said XOR gate generates said effective operation signal.

7. The apparatus according to claim 1, wherein said effective operation signal is a logical "0" for an effective addition operation and a logical "1" for an effective substraction operation.

8. The apparatus according to claim 1, wherein said logic gate is an AND gate.

9. The apparatus according to claim 1, wherein said floating-point pipeline further includes a shifter for shifting said second operand and an incrementer for incrementing a result from said shifter.

10. A floating-point processor comprising:

an end-around carry adder;

shift-comparison logic for providing a shift-count signal in response to exponent bits of a first operand, a second operand, and a third operand;

sign-comparison logic for providing an effective operation signal in response to a bit of each of said first, second, and third operands; and a logic gate, coupled to said shift-comparison logic and said sign-comparison logic, for combining said shift-count signal and said effective operation signal with a carry-out signal generated by said end-around carry adder to provide an end-around carry signal for said end-around carry adder.

11. The floating-point processor according to claim 10, wherein said shift-comparison logic includes a first adder, a second adder, and a comparator, wherein said first adder receives said exponent bits from said first, second, and third operands and a numerical constant.

12. The floating-point processor according to claim 10, wherein said sign-comparison logic includes an XOR gate for receiving said sign bits from said first, second, and third operands and an operation bit that indicate whether an operation is an addition or subtraction.

13. The floating-point processor according to claim 10, wherein said logic gate is an AND gate.

14. A method for generating an end-around carry for an end-around carry adder in a floating-point pipeline within a computer system, wherein said floating-point pipeline includes a first operand, a second operand, and a third operand, said method comprising the steps of:

generating a shift-count signal in response to exponent bits of each of said first, second, and third operands;

generating an effective operation signal in response to a sign bit of each of said first, second, and third operands; and combining said shift-count signal and said effective operation signal with a carry-out signal generated by said end-around carry adder to provide an end-around carry signal for said end-around carry adder.

15. The method according to claim 14, wherein said shift-count signal is a logical "0" when a shift-count is less than 26 and said shift-count signal is a logical "1" when a shift-count is greater than or equal to 26.

16. The method according to claim 14, wherein said effective operation signal is a logical "0" for an effective addition operation and a logical "1" for an effective substraction operation.

* * * * *